US007783046B1

(12) United States Patent
Sklyarov et al.

(10) Patent No.: US 7,783,046 B1
(45) Date of Patent: Aug. 24, 2010

(54) PROBABILISTIC CRYPTOGRAPHIC KEY IDENTIFICATION WITH DETERMINISTIC RESULT

(75) Inventors: Dmitry V. Sklyarov, Moscow (RU); Andrey V. Belenko, Moscow (RU)

(73) Assignee: Elcomsoft Co. Ltd., Moscow (RU)

( * ) Notice: Subject to any disclaimer, the term of this patent is extended or adjusted under 35 U.S.C. 154(b) by 762 days.

(21) Appl. No.: 11/752,339

(22) Filed: May 23, 2007

(51) Int. Cl.
*H04L 9/08* (2006.01)
(52) U.S. Cl. .......................... 380/286; 380/44; 380/45; 380/46; 380/47; 380/277
(58) Field of Classification Search ................ 380/44, 380/45, 46, 47, 277, 286
See application file for complete search history.

(56) References Cited

U.S. PATENT DOCUMENTS 7,599,492 B1 * 10/2009 Malyshev et al. ............. 380/37

OTHER PUBLICATIONS

Oechslin, Philippe; Making a Faster Cryptanalytic Time-Memory Trade-Off; 2003; Proceedings of Advances in Cryptology—23th Annual International Cryptology Conference (CRYPTO'03), D. Boneh, Ed. Lecture Notes in Computer Science, vol. 2729. IACR, Springer-Verlag, Santa Barbara, CA. pp. 617-630.*

* cited by examiner

*Primary Examiner*—Edan Orgad
*Assistant Examiner*—Bradley Holder
(74) *Attorney, Agent, or Firm*—Bardmesser Law Group

(57) ABSTRACT

An algorithm for recovering a key used to produce a cyphertext-plaintext pair includes (a) loading at least a portion of a probabilistic key table into memory; (b) distributing the keys in the portion of the probabilistic key table into a first plurality of buffer files that are in RAM. A beginning portion of each key is used as an index identifying the buffer file; (c) when any of the files in the first plurality of buffer files is full, storing contents of the first plurality of buffer files in unused space of a corresponding file of a second plurality of buffer files, wherein the second plurality of buffer files are kept on a hard disk drive; (d) resetting the first plurality of buffer files to zero; (e) repeating steps (a)-(d) for all keys in the probabilistic key table until one of the files of the second plurality of buffer files is full; (f) for each of the second plurality of buffer files, updating a bitmask file corresponding to keys missing from the probabilistic key table; (g) resetting the second plurality of buffer files to zero; and (h) repeating steps (a)-(g) for all keys in the probabilistic key table. If the key is not in the probabilistic key table, the missing keys can be tested.

15 Claims, 9 Drawing Sheets

| START KEY K1 | END KEY K1 |
| START KEY K2 | END KEY K2 |
| START KEY K3 | END KEY K3 |
| START KEY K4 | END KEY K4 |
| START KEY K5 | END KEY K5 |
| ⋮ | ⋮ |

FIG. 2
CONVENTIONAL ART

PROBABILISTIC CRYPTOGRAPHIC KEY IDENTIFICATION WITH DETERMINISTIC RESULT

BACKGROUND OF THE INVENTION

1. Field of the Invention

The present invention is related to cryptography, and, more particularly, to guaranteed recovery of a cryptographic key where a plaintext-cyphertext pair is known.

2. Description of the Related Art

One common problem that is frequently encountered in the field of cryptography is discovering a cryptographic key in a situation where the cryptographic algorithm itself a priori known. For example, consider the situation illustrated schematically in FIG. 1. FIG. 1 illustrates how plaintext is converted to cyphertext through the use of a cryptographic algorithm and a key. There are many examples of such cryptographic algorithms, such as RC4, RC5, RC6, AES, DES, Blowfish, and so on. These algorithms all require a key, and giving a incorrect key as an input to the cryptographic function will produce "garbage" as an output.

The key is a sequence of bits, whose length is chosen depending on the security desired for the particular application. For example, several years ago, in the 1990s, 40-bit keys were common, particularly due to U.S. export control restrictions. Currently, 64-bit keys, and 80-bit keys are frequently used. 128-bit keys are also beginning to be used, and, at the present time, are generally considered to be virtually unbreakable using any of the known methods.

Generally, the selection of the length of the key affects not just the security, but also the efficiency of the algorithm. The longer the key, the more secure the encryption, but also, the longer the process of encrypting any particular plaintext. Thus, it is generally the practice to select the length of a key that would be resistant to a brute force attack (or other known forms of attack) in any realistic time frame. For example, if an 80-bit key would require on the order of 1 million years to identify the correct key using a known method, there is no point in using longer keys, where the attack would take 1 billion years, for the self-evident reason that there is no information that needs to be protected for that period of time.

There are several known methods for attacking cryptographic algorithms. In general, the problem is posed as follows: a plaintext-cyphertext pair is known, and the cryptographic algorithm used to produce the cyphertext from the plaintext is also known, but the cryptographic key used in the cryptographic algorithm is unknown. One situation where this can happen is where a message is intercepted both in its cyphertext form, and in its plaintext form. Another situation where a plaintext-cyphertext pair is available is where a file is encrypted, and some information is known about the file—for example, many files, when stored in known formats (such as Microsoft Word, Excel, Adobe Acrobat, and so on) contain certain header and other file identification information, which is always found at a specific location in the file, and is always the same. As another example, it may be possible to run a string of all zeros through the cryptographic algorithm, generating a cyphertext (even in a situation where the key is not known—for example, where a communication system is at any given point not transmitting anything useful, but is simply sending zeros through the communications channel, in order to maintain lock with the receiver). The relevant point is that for purposes of cryptographic attack, there are three things that are known a priori—the cryptographic algorithm, at least one example of a plaintext, and at least one corresponding example of a cyphertext.

The mathematical question is therefore "what is the key that was used to generate the cyphertext?" Once the key is known, any cyphertext generated by that algorithm using that key can always be very rapidly decrypted.

There are three basic conventional approaches to identifying the key that are known in the conventional art. One approach is the brute force method, where every possible key is run through the cryptographic algorithm, sequentially, one after another, until the right key is found. The amount of time that such an approach would take depends on the number of keys that need to be tested, and the one-way cryptographic function itself. For keys of length N, there are a total of $2^N$ possible keys, which need to be tested sequentially.

Also, it is worth nothing that the process of inputting a key into a cryptographic function and testing the result for correctness has been optimized to a point where no further improvements are likely. Thus, for relatively short keys, such as 16-bit keys or 29-bit keys, this is a manageable problem. For longer keys, such as 56-bit keys or 64-bit keys, this is a problem that, given the current state of computer hardware, is at the edge of the capabilities of the hardware, if the result needs to be known in any reasonable amount of time. Longer keys, such as 80 bit or 128-bit keys, present an insurmountable problem for the brute force approach, given the current state of the computer hardware (and will likely remain so for any foreseeable future).

The brute force approach, however, has one major advantage—it is guaranteed to produce a result at some point in time (although that point may be reached relatively quickly, or may occur at a distant future), however, the fact that sooner or later one of the keys will be the right key is guaranteed by this approach.

Another approach is the use of cryptographic tables, where for a known plaintext (typically a string of all zeros, or, for frequently used document and file formats, a portion of the file representing header information, or file format information, which is always the same), is converted to cyphertext. Thus, a large table is generated, with plaintext-cyphertext pairs that correspond to each possible key. As a further optimization, the table can then be sorted by cyphertext. When the key for a particular newly-received cyphertext needs to be identified, all that needs to be done is locate the newly received cyphertext in the table (a process that even for very large tables does not take very long, on the order of seconds or at most a few minutes), and the key is then identified.

This process also has a major advantage from a mathematical perspective—it is always guaranteed to produce a result, since the table contains all the possible keys, and/or derivatively, all the possible cyphertexts for a particular plaintext (note that for each different plaintext, a separate table needs to be generated, which is why "standard" plaintexts are frequently used, either using commonly found headers and other information of that nature in files of known format, or strings of all zeros).

The two methods described above, therefore, represent the two opposite ends of the spectrum—in the first method, the brute force testing of each possible key requires a very long time, but does not require any "preparatory work" on the part of the attacker. In the second case, the process of identifying the key is very fast (in essence, trivial in comparison to other methods—on the order of seconds), however, the process of generating a table can be very time consuming—as of 2007, no such table exists for 64-bit keys, and several years of continuous computation would be necessary to generate such as table. Also, such tables can be very large—a table for 40-bit keys is on the order of 5 Terabytes, and a table for 64-bit keys would be 134 million terabytes in size—a clearly unfeasible amount of storage today. Although computer hardware is improving, attempting to do this the same thing for 80-bit keys is at the present time a virtually insurmountable challenge, and attempting to create such a table for 128-bit keys is, at the present time, a practical impossibility.

A third conventional method is typically referred to as "Rainbow Tables," and represents a compromise, or a trade-off, between the two extremes. See *Making a Faster Cryptanalytical Time-Memory Trade-Off*, Philippe Oechslin, Advances in Cryptology—CRYPTO 2003, 23rd Annual International Cryptology Conference, Santa Barbara, Calif., USA, Aug. 17-21, 2003, Proceedings, Lecture Notes in Computer Science 2729, Springer (2003) (which builds on the 1980 work of Martin Hellmann, which is sometimes referred to as "classical tables"). In the Rainbow Table approach, an algorithm is used to generate a relatively large table (but much smaller than the tables in the second method, described above—on the order of a few gigabytes for 40-bit keys), which corresponds to most, but not all, of the keys. Typically such as table, as shown somewhat simplistically in FIG. 2, can be represented by groups of keys, beginning with one start key, and ending with one end key, and with a certain number of keys in between (a typical number would be on the order of 10,000 keys between start key K1 and end key K1). The number is always the same, and therefore the number of keys between start key K2 and end key K2 is the same as the numbers of keys between start key K3 and end key K3 and so on. Only the start and end keys need to be stored, but not the intermediate keys in the chains, which are generated "on the fly."

The Rainbow Table approach has an advantage in that it takes much less storage space to store such a table, compared to a table for every single key, as described earlier. However, the Rainbow Table approach has one significant disadvantage—it is not guaranteed to produce a result. Typically, when a Rainbow Table is generated, the parameters for generating the table are chosen as a compromise between several factors—the amount of time it takes to generate the table, estimated attack time complexity, the size of the table (where storage requirements are an issue), and the probability that the key will be found in the table. Typically such probabilities (usually where several Rainbow Tables are used) are on the order of 70-90% for a single table, and 95%, 99%, and sometimes 99.99% where multiple tables are used. The higher the probability of finding the key that the user desires, the larger the table, and the longer such a table will take to generate.

Depending on the application, the fact that the Rainbow Table is not guaranteed to produce a result may or may not be a problem. There are services available commercially, which, when provided with an encrypted document, can produce a key to the user requesting the service (frequently on-line). The fact that a very small percentage of users will not "get an answer" is not commercially a problem—it is often easier to simply give the users refunds in those rare cases where the key is not in the Rainbow Table. On the other hand, there are applications where a certainty of finding a key is relatively important—for example, in law enforcement or national security applications it is highly desirable to know that whatever method is used to attack the encryption is one that is guaranteed to produce a result.

SUMMARY OF THE INVENTION

Accordingly, the present invention is related to a system and method for rapid and deterministic identification of a cryptographic key using probabilistic table methods that substantially obviates one or more of the disadvantages of the related art.

In one aspect, there is provided a system, method and computer program product for recovering a key used to produce a cyphertext-plaintext pair, including (a) loading at least a portion of a probabilistic key table into memory; (b) distributing the keys in the portion of the probabilistic key table into a first plurality of buffer files that are in random access memory, such that a beginning portion of each key is used as an index identifying the buffer file; (c) when any of the files in the first plurality of buffer files is full, storing contents of the each of the first plurality of buffer files in unused space of a corresponding file of a second plurality of buffer files, wherein the second plurality of buffer files are kept on a hard disk drive; (d) resetting the files in the first plurality of buffer files to zero; (e) repeating steps (a)-(d) for all keys in the probabilistic key table until at least one of the files of the second plurality of buffer files is full; (f) for each of the second plurality of buffer files, updating a bitmask file corresponding to keys missing from the probabilistic key table; (g) resetting the files in the second plurality of buffer files to zero; and (h) repeating steps (a)-(g) for all keys in the probabilistic key table. At some point afterwards (either immediately, or much later), if the key used to generate the plaintext-cyphertext pair is not in the probabilistic key table, the missing keys can be tested to identify the key used to generate the plaintext-cyphertext pair.

The probabilistic key table can be a Rainbow Table, a plurality of Rainbow Tables, or a Hellman classical table. In step (f), a value of each key in the second plurality of buffer files is used as an index into a corresponding bitmask file, or a value of each missing key corresponds to a combination of an index of the bitmask file and a position of a bit in the bitmask file that represents whether or not the key is a missing key, or all the bitmask files are combined into a single bitmask file, and wherein a value of each missing key corresponds to a position of a bit in the bitmask file that represents whether or not the key is a missing key.

In another aspect, a system, method and computer program product for recovering a key of length $2^N$ used to produce a cyphertext-plaintext pair includes (a) generating at least some of the $2^N$ keys using a probabilistic key table; (b) distributing the keys in the portion of the probabilistic key table into a first plurality of buffer files that are in random access memory, such that a beginning portion of each key is used as an index identifying the buffer file; (c) when any of the files in the first plurality of buffer files is full, storing contents of the each of the first plurality of buffer files in unused space of a corresponding file of a second plurality of buffer files, wherein the second plurality of buffer files are kept on a hard disk drive; (d) resetting the files in the first plurality of buffer files to zero; (e) repeating steps (a)-(d) for all keys in the probabilistic key table until at least one of the files of the second plurality of buffer files is full; (f) for each of the second plurality of buffer files, updating a bitmask file corresponding to keys missing from the probabilistic key table; (g) resetting the files in the second plurality of buffer files to zero; (h) repeating steps (a)-(g) for all keys in the probabilistic key table; and (j) generating a list of missing keys, based on the bitmask files. If the key used to generate the plaintext-cyphertext pair is not in the probabilistic key table, the missing keys can be tested to identify the key used to generate the plaintext-cyphertext pair.

In another aspect, a system, method and computer program product comprising a computer useable medium having computer program logic stored thereon for executing on at least one processor, for recovering a password based on its hash value include (a) generating at least some of the possible passwords using a probabilistic hash table; (b) distributing the passwords in the portion of the probabilistic hash table into a first plurality of buffer files that are in random access memory, such that a beginning portion of password is used as an index identifying the buffer file; (c) when any of the files in the first plurality of buffer files is full, storing contents of the each of the first plurality of buffer files in unused space of a corresponding file of a second plurality of buffer files, wherein the second plurality of buffer files are kept on a hard disk drive; (d) resetting the files in the first plurality of buffer files to zero; (e) repeating steps (a)-(d) for all passwords in the probabilistic hash table until at least one of the files of the second plurality of buffer files is full; (f) for each of the second plurality of buffer files, updating a bitmask file corresponding to passwords missing from the probabilistic hash table; (g) resetting the files in the second plurality of buffer files to zero; (h) repeating steps (a)-(g) for all hash values in the probabilistic hash table; and (j) generating a list of missing passwords, based on the bitmask files. If the password used to produce the hash value is not in the probabilistic hash table, the missing passwords can be tested to identify the password used to generate the hash value.

In another aspect, there is provided a system for recovering a key of length $2^N$ used to produce a cyphertext-plaintext pair, including a computer system having a processor; means for generating at least some of the $2^N$ keys using a probabilistic key table; means for distributing the keys in the portion of the probabilistic key table into a first plurality of buffer files that are in random access memory, such that a beginning portion of each key is used as an index identifying the buffer file; when any of the files in the first plurality of buffer files is full, means for storing contents of the each of the first plurality of buffer files in unused space of a corresponding file of a second plurality of buffer files, wherein the second plurality of buffer files are kept on a hard disk drive; means for resetting the files in the first plurality of buffer files to zero; means for repeating previous activities for all keys in the probabilistic key table until at least one of the files of the second plurality of buffer files is full; for each of the second plurality of buffer files, means for updating a bitmask file corresponding to keys missing from the probabilistic key table; means for resetting the files in the second plurality of buffer files to zero; means for repeating previous activities for all keys in the probabilistic key table; means for generating a list of missing keys, based on the bitmask files; wherein if the key used to generate the plaintext-cyphertext pair is not in the probabilistic key table, the missing keys can be tested to identify the key used to generate the plaintext-cyphertext pair.

Additional features and advantages of the invention will be set forth in the description that follows, and in part will be apparent from the description, or may be learned by practice of the invention. The advantages of the invention will be realized and attained by the structure particularly pointed out in the written description and claims hereof as well as the appended drawings.

It is to be understood that both the foregoing general description and the following detailed description are exemplary and explanatory and are intended to provide further explanation of the invention as claimed.

BRIEF DESCRIPTION OF THE ATTACHED FIGURES

The accompanying drawings, which are included to provide a further understanding of the invention and are incorporated in and constitute a part of this specification, illustrate embodiments of the invention and together with the description serve to explain the principles of the invention.

In the drawings:

FIG. 2 illustrates the structure of Rainbow Tables.

DETAILED DESCRIPTION OF THE PREFERRED EMBODIMENTS

Figure 1:
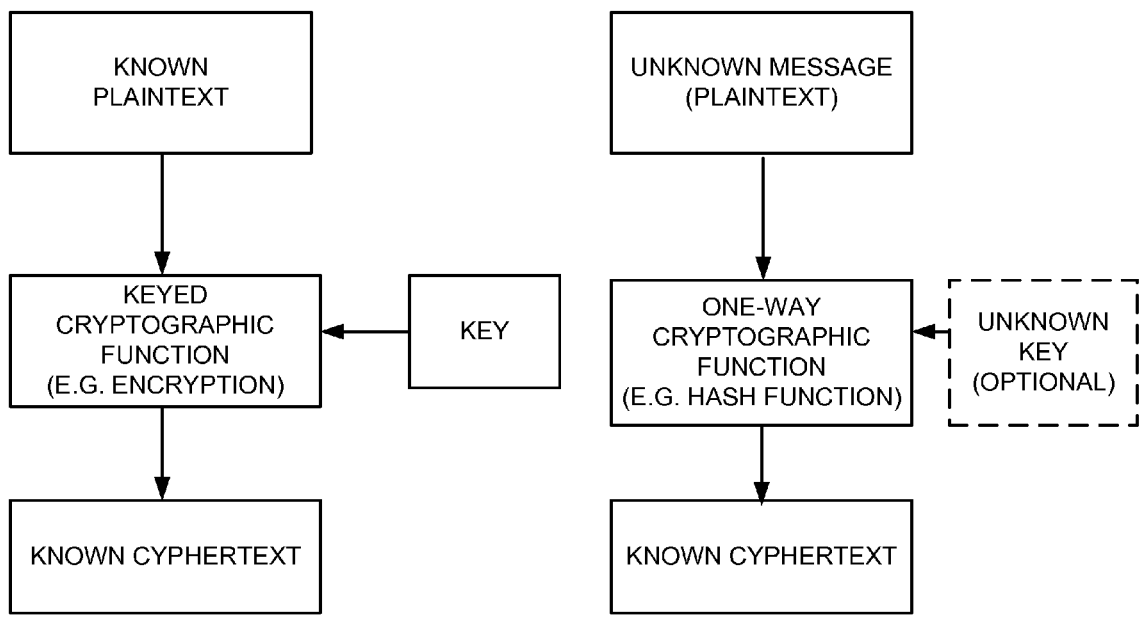
FIG. 1 illustrates a conventional process of encrypting plaintext using a cryptographic function and a key.

Reference will now be made in detail to the embodiments of the present invention, examples of which are illustrated in the accompanying drawings.

Accordingly, the present invention is directed to a system and method for combining a probabilistic approach of Rainbow Tables with an algorithm that is guaranteed to produce a result (i.e., to identify the correct cryptographic key) in all circumstances, and relatively quickly.

The problem of guaranteeing that, even when using a probabilistic approach of Rainbow Tables, the key will be identified correctly, therefore can be thought of as the problem of identifying which keys in the particular Rainbow Table (s) are missing. This is, in fact, not at all a trivial problem. In theory, if the capacity of the hardware were several orders of magnitude greater than it is today, such a problem could also be solved using a brute force approach, even for key length of 40 bits. For example, the Rainbow Table could be sorted by key, and any gaps in the Rainbow Table identified, and then compared with the "full table."

However, the practical reality is such that this is an impossible task, or at least an impractical task, given the current and foreseeable state of the hardware. For example, consider a situation where a 40-bit key is used—a relatively common situation today, for many practical applications, where compatibility with earlier systems and formats is necessary (although use of even longer keys, such as 128-bit keys is becoming more widespread). With a 40-bit key, there are $2^{40}$ elements (keys) total in the full table, with each key having a length of 5-bytes. The full table therefore occupies a total of $40/8 \times 2^{40}$ bytes, or $5 \times 1$ terabyte, or 5 terabytes. It may be possible to use some "tricks" to reduce the amount of storage required by the full table somewhat, but generally, the volume of data at issue is on the order of several terabytes. This is vastly greater than the amount of random access memory available on real computers—for example, 16 gigabytes of real memory in an Intel-based computer today (such as available from Apple Computer, Inc.) is considered a very impressive amount, and such machines are very expensive. Thus, storing and manipulating the full table containing every possible key (i.e., $2^{40}$ keys total) in RAM is virtually impossible.

Although memory can be virtualized (in essence, some pages of random access memory can be swapped on and off disk), this does not solve the problem—disk access is two or three orders of magnitude slower than reading or writing to random access memory, and with $2^{40}$ elements in a table, the process would, for all practical purposes, take forever. If the full table were to be kept only partly on disk, and the elements in a table flagged for presence (or not presence) in the Rainbow Table, the problem would be the same—accessing a disk is much slower than accessing a random access memory, and for a 40-bit key, this could never be done in any reasonable amount of time, given current technology.

The problem is obviously compounded for longer keys, such as a 56-bit key, and is virtually unsolvable for 64-bit keys or longer.

Thus, the real-world problem is reframed as follows: how to identify those "missing" keys, while at the same time remaining within the constraints of realistically available hardware—the purely mathematical problem is solvable in the abstract (or solvable in practice for very short keys, such as keys that are only a few bits long), but, in the real world, is extremely difficult to solve for longer keys, such as 40-bit keys, 56-bit keys, 64-bit keys, and so on. Therefore, the approach described herein is directed to a modification of the Rainbow Table method, which uses Rainbow Tables to first test whether the key that is being sought is found in the Rainbow Table, and then, if not found, testing the remaining keys to identify the correct one, thereby giving a deterministic result despite the use of a probabilistic time-memory tradeoff approach as the first step.

The mathematical problem is therefore the following: how to identify the list of those "missing" keys that did not make it into the Rainbow Table(s). It should also be noted that the number of missing keys is generally relatively small compared to the total number of keys. A typical Rainbow Table might have a probability of 70% of containing the sought after key. Several different tables are often used, such that the probability of finding the key can be easily calculated. In this case, if each Rainbow Table has a 70% probability of containing the sought-after key, then, with two such tables, the probability of finding the key in the Rainbow Tables increases to 91% (1−(1−0.7)(1−0.7)=0.91), and the probability of finding the key with three such tables increases to 97.3% (1−(1−0.7)(1−0.7)(1−0.7)=0.973), and so on. Thus, the number of keys that are "missing", in a typical situation, might be only 1% of the total number of keys, or, often, only a fraction of a percent. Brute-force testing only the missing keys (as opposed to all the $2^{40}$ keys) is something that can be done relatively quickly.

The proposed method for guaranteeing that a key will be found, in combination with using the probabilistic method of the Rainbow Tables, will be described with reference to FIGS. 3-6. As show in FIG. 3, a number of keys, labeled K11-K1last have been previously generated for Rainbow Table 1, which has been stored on a disk prior to beginning the process. Similarly, another chain of keys, labeled K21-K2last, belong to Rainbow Table 2 (or possibly to the same table). As noted earlier, each such Rainbow Table has a certain probability of containing the correct key. A typical probability is 0.7, or 70%. Note also that the different Rainbow Tables are generated with slightly different parameters (since otherwise, if they were generated with identical parameters, the tables would be identical, and using multiple identical Rainbow Tables makes no sense). It should also be noted that the keys in the Rainbow Tables are not sequential, but are more or less random—in other words, key K12 is not "the next numerical key" compared to key K11, though it can be derived from the key K11.

In the example below, 40-bit keys are used, and the size of the files corresponds to 40-bit keys, although it will be appreciated that the approach described herein readily extends to other key lengths.

Figure 3:
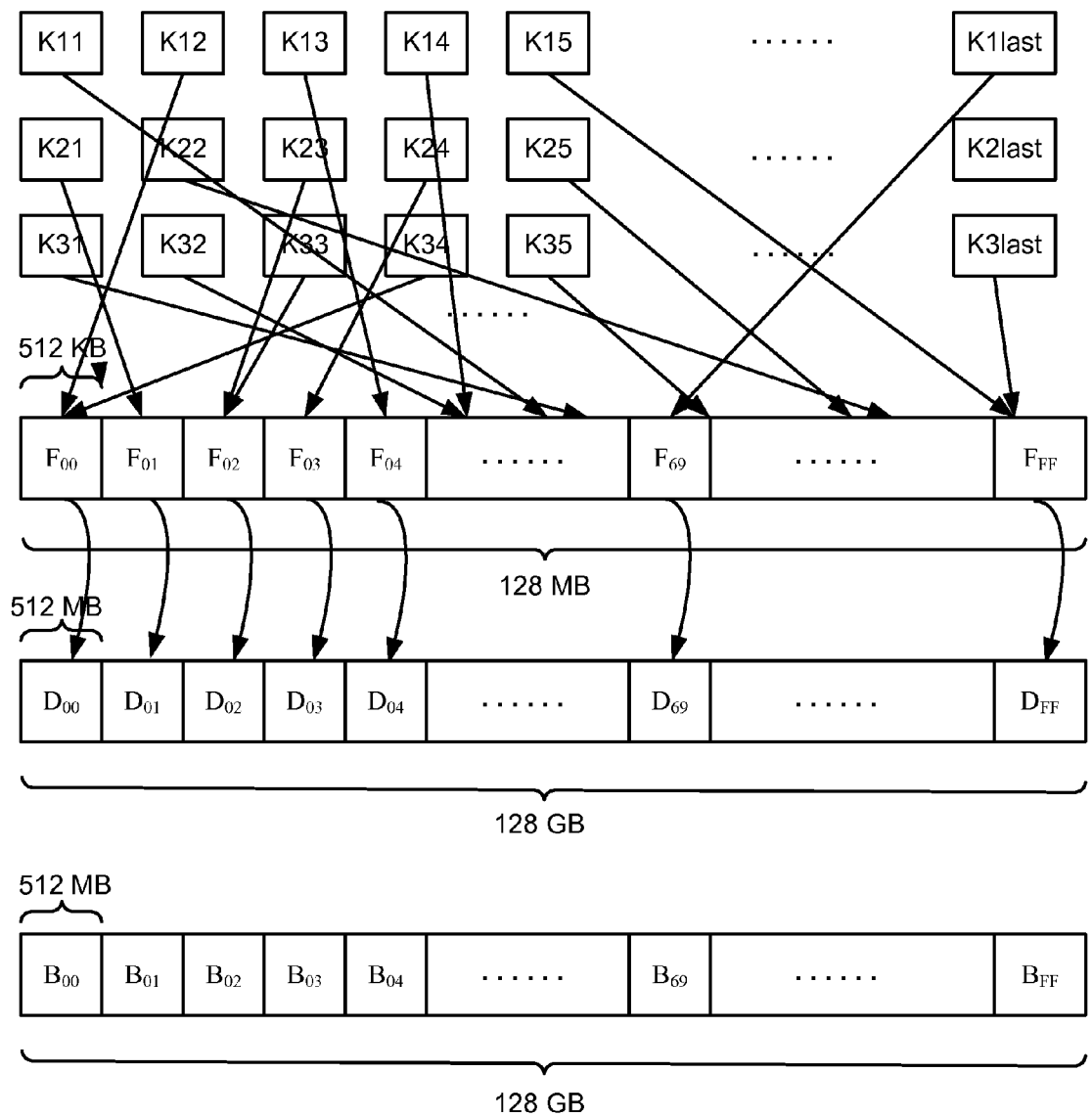
FIGS. 3-7 illustrate the process of identifying keys that are missing from the Rainbow Tables.
Figure 4:
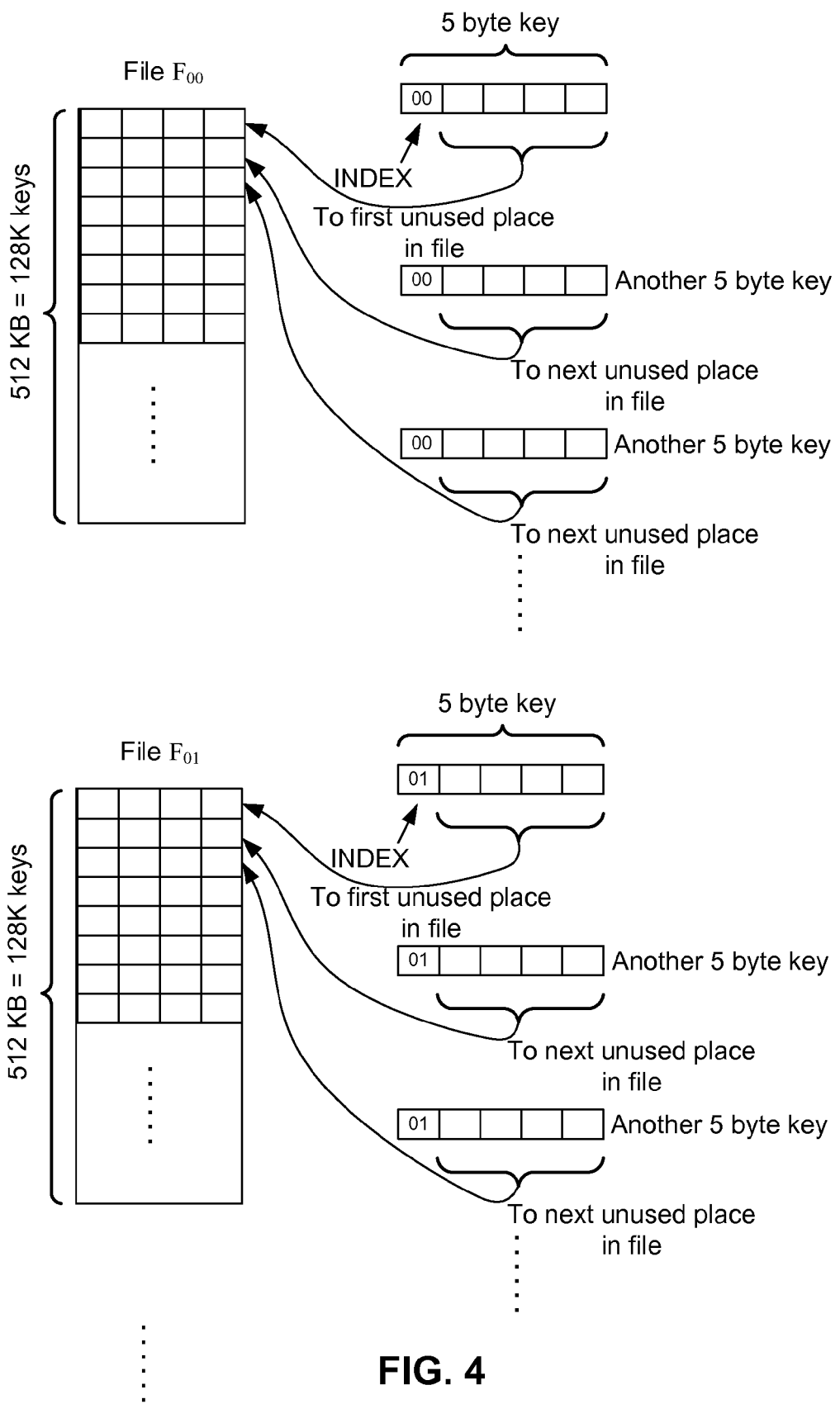

As further shown in FIG. 3, 256 files, labeled $F_{00}$ through $F_{FF}$, are allocated in random access memory. Each file $F_{00}$-$F_{FF}$ (here, the indices are in hexadecimal, so FF=255 decimal) has a maximum size of 512 kilobytes, and a total amount of memory occupied by the files $F_{00}$-$F_{FF}$ is therefore 128 megabytes. This is a number that is chosen because it is well within the capabilities of current hardware. First, Rainbow Table 1 (or at least the portion of the Rainbow Table 1 that fits into random access memory) is loaded into random access memory, and the keys are then distributed, one after another, into files $F_{00}$-$F_{FF}$. The first 8 bits of each key are used as an index, corresponding to the number of the files $F_{00}$-$F_{FF}$. This is illustrated in FIG. 4, which shows the process of distributing the 5-byte (40-bit) keys into the files $F_{00}$-$F_{FF}$. Since the first byte of the key is used as an index, only the last four bytes of the key need to be stored in the file $F_{00}$. The algorithm goes sequentially through each key in the Rainbow Table, and stores each key in the next unused place in each of the files $F_{00}$-$F_{FF}$.

As will be appreciated, in this case, each file $F_{00}$-$F_{FF}$, having maximum size of 512 kilobytes, can store a maximum of 128K keys (remembering again that the first byte of the key is used as an index, and corresponds to the number of the file).

Note also that in the Rainbow Tables, it is quite common to have duplication of the keys—in other words, the same key can appear multiple times in the same Rainbow Table (and can also appear multiple times when multiple Rainbow Tables are used). Thus, in this case, the same key may appear twice in the same file, which as a practical matter happens routinely.

It should also be noted that since the numeric values of the keys themselves in the Rainbow Table are distributed more or less randomly, the files $F_{00}$-$F_{FF}$ will "fill up" more or less at the same rate (although not necessarily at exactly the same rate).

Figure 5:
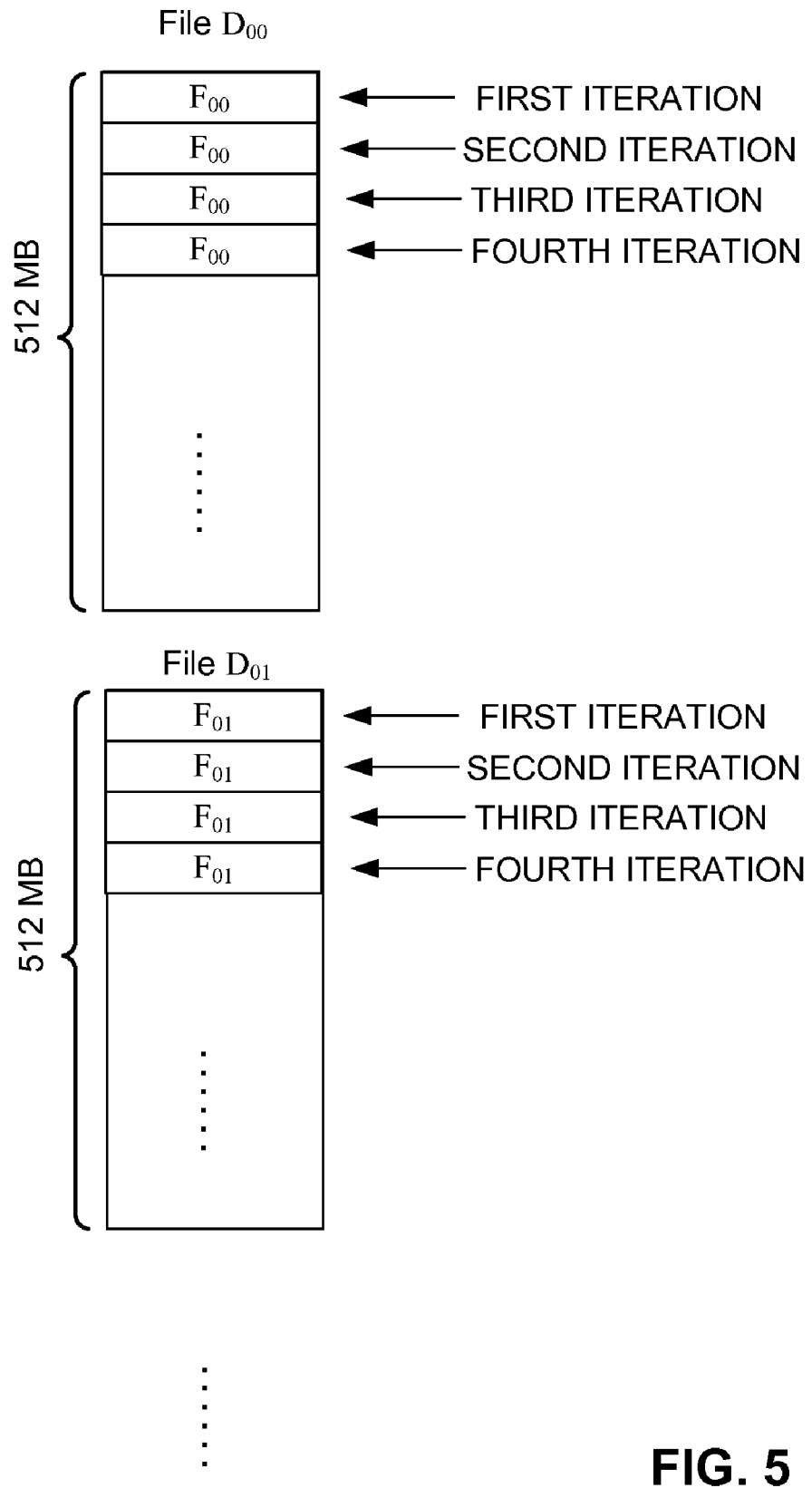

At some point, one of the files $F_{00}$-$F_{FF}$ will be completely full, at which point all of the $F_{00}$-$F_{FF}$ files are "dumped" to disk, and their content stored in the files $D_{00}$-$D_{FF}$. Each of the $D_{00}$-$D_{FF}$ files have a maximum size of 512 megabytes, and the total volume occupied by the 256 "D" files is 128 gigabytes. The structure of the $D_{00}$-$D_{FF}$ files is illustrated in FIG. 5. As shown in FIG. 5, the file $F_{00}$ is "dumped" into the file $D_{00}$, the file $F_{01}$ is "dumped" into the file $D_{01}$, and so on. The $D_{00}$-$D_{FF}$ files are also 4 bytes wide, same as the $F_{00}$-$F_{FF}$ files. Shown in FIG. 5 is the "dump" from the first iteration—the files $F_{00}$, $F_{01}$, and so on. Also shown in FIG. 5 are the "dumps" from the next iterations of the process, where the files are also labeled as $F_{00}$, $F_{01}$, and so on, as discussed further below.

Returning to FIG. 3, the second iteration of the process can then begin. The files $F_{00}$-$F_{FF}$ are reset to zero, and the process of filling up the files $F_{00}$-$F_{FF}$ can begin again, with the remaining keys from the Rainbow Tables. At some point, one of the "F" files will fill up (obviously, not necessarily the same "F" file that was full on the first iteration), and all of the $F_{00}$-$F_{FF}$ files are again dumped into the files $D_{00}$-$D_{FF}$, which are stored on the disk—see second iteration" in FIG. 5.

At that point, the third iteration begins, where the "F" files are again reset to 0, and the files again begin to fill up with keys from the Rainbow Tables. This process will continue for as many iterations as necessary, until all the keys in all the Rainbow Tables that are used, and all of the keys have been distributed to all of the "F" files, and all of the "F" files have been dumped into the "D" files. At the end of the process, the structure corresponding to 256 "D" files exist on the disk, having a maximum size of 128 Gigabytes (although in practice, the size will be somewhat smaller). Note also that FIG. 3 shows a set of "B" files, labeled $B_{00}$-$B_{FF}$. The "B" files represent a bit mask, which permits identifying missing keys. Each such "B" file is 512 megabytes in size, and all the "B" files collectively occupy 128 gigabytes—i.e., one bit for each of the $2^{40}$ keys. The objective is to generate the bit mask files ("B" files), and from them identify those keys that are missing from the Rainbow Tables.

Figure 6:
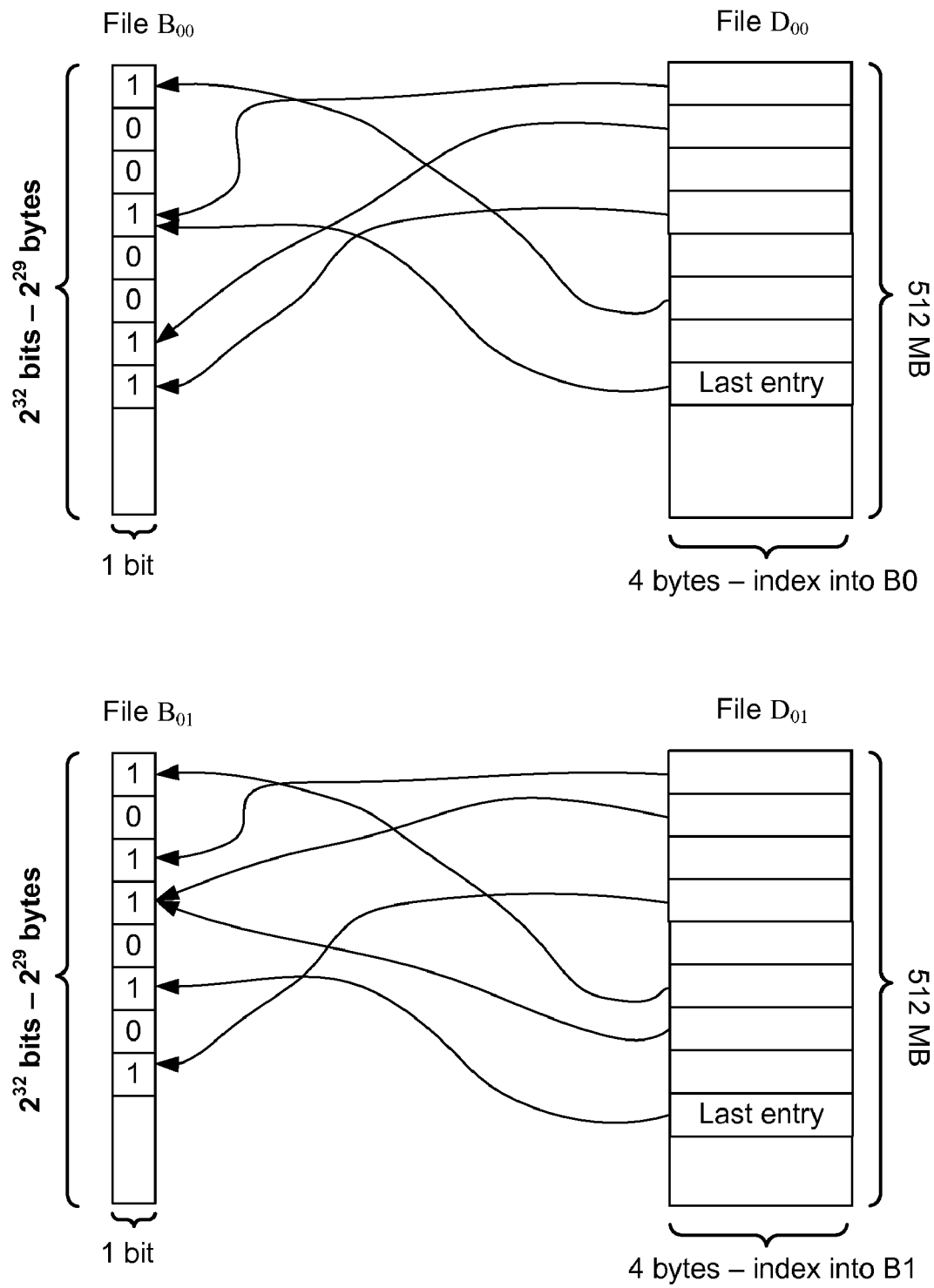

FIG. 6 illustrates the process of generating the bit mask files. The bit mask files ("B" files) can be viewed as one-bit wide, and $2^{32}$ bits long (or 512 megabytes in size) each. As further shown in FIG. 6, each key in the file $D_{00}$ is an index into the file $B_{00}$. Note again that only four bytes of the 5-byte key are stored in the file $D_{00}$, since the "0" index corresponds to the first byte of the key. Initially, the file B0 is set to all zeros, however, by stepping through the file $D_{00}$ (which is loaded into memory for the operation), the corresponding bits in the file $B_{00}$ are set to one. Note also that since it is quite possible that many of the keys in the file $D_{00}$ will be identical, several keys could point to the same location in the file $B_{00}$—for practical purposes, it doesn't matter, since the bit, once it is set to 1, can be again set to 1—it is easier, as a matter of programming, to simply set the appropriate bit to 1 again and again, rather than check whether that bit has already been set to 1—however, this is an implementation detail.

At some point in time, the algorithm will reach the last key in the file $D_{00}$ (in some cases, the last key will be located at the physical end of the file $D_{00}$, at position 512 megabytes minus 4, but as a practical matter, in most cases there will be some "empty space" at the end portion of the file $D_{00}$. At the conclusion of operations with the files $D_{00}$ and $B_{00}$, the file $B_{00}$ will contain many ones, and a few zeros—the vast majority of the bits in the file $D_{00}$ will be 1, but a small fraction, typically 1%, or a fraction of a percent, will be 0's.

The same process is then repeated for the files $D_{01}$ and $B_{01}$—the file $D_{01}$ is loaded into memory from disk, the file B1 is initially set to all zeros, and then the 4-bit portion of the 5-byte keys in the file D1 are used as an index into the file B1, setting the appropriate bits of the file $B_{01}$ to 1. As with the file $D_{00}$, when the process is completed, most bits in the file $B_{01}$ will be set to 1, but a few will remain 0's. The process is repeated for the remaining $D_{02}$-$D_{FF}$ files, such that when the process is done, a set of "B" files, called $B_0$-$B_{255}$ in this discussion, can be viewed as a very long bit string (in this case, a 1-terabit-long string), where some of the bits are 0.

Figure 7:
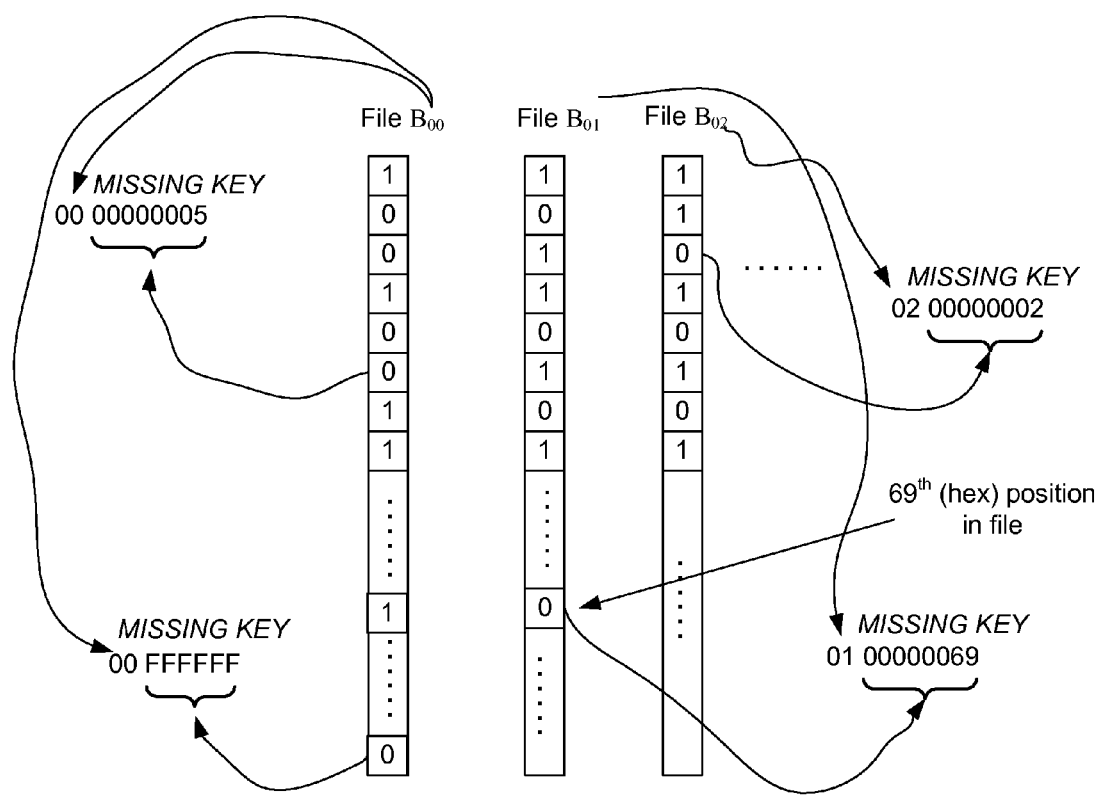

FIG. 7 illustrates how the actual missing keys can then be generated. Shown in FIG. 7 are three of the bit mask files, $B_{00}$-$B_{02}$. Each 0 bit, it will be recalled, corresponds to a missing key. In this case, using the sixth position in the file $B_{00}$, the value of the key is therefore the index of the file (00 in hexadecimal) combined with the value of the position—in this case, 000005 hexadecimal. The file $B_{00}$ contains other 0's in other locations, each of which corresponds to a missing key. As an example, in this case, the last bit in the file $B_{00}$ is 0, therefore, the missing key is 00 (from the index $D_{00}$) combined with FFFFFF (hexadecimal), giving a value of the key 00FFFFFF (hexadecimal). Similarly, in the case of the file $B_{01}$, at position 69 (hexadecimal) the value of the bit is zero. Therefore, the value of the key is 0100000069 (hexadecimal). Similarly, for the bit mask file $B_{02}$, the third position in the file has a bit value of zero. Therefore, the value of the missing key is a combination of 02 (hexadecimal) and 00000002 (hexadecimal), for a key value of 0200000002 (hexadecimal).

By continuing this process with all of the remaining bit mask files $B_{03}$-$B_{FF}$, all of the remaining key values can be identified and stored in a separate table or list. As noted earlier, the number of such keys (compared to the total number of possible keys, which is $2^{40}$ in this example) is relatively small—on the order of 100 times smaller, or even on the order of 10,000 times smaller than the total number of keys ($2^{40}$).

Thus, once the missing keys are identified, the process of attacking the encryption, given the known plaintext-cyphertext pair, can be broken down into two parts: first, test if the key is present in the Rainbow Tables, and second, if the key is not present in the Rainbow Tables, test the remaining missing keys, which were identified by the procedure described above.

Therefore, the approach described herein is a combination of two approaches—a probabilistic approach using Rainbow Tables, which is highly likely (but not guaranteed) to yield the desired result, and a mechanism for testing all of the missing keys, which addresses the possibility that the key that is sought after is not in the Rainbow Tables. Therefore, identifying a key is guaranteed, in a fairly reasonable amount of time.

Figure 8:
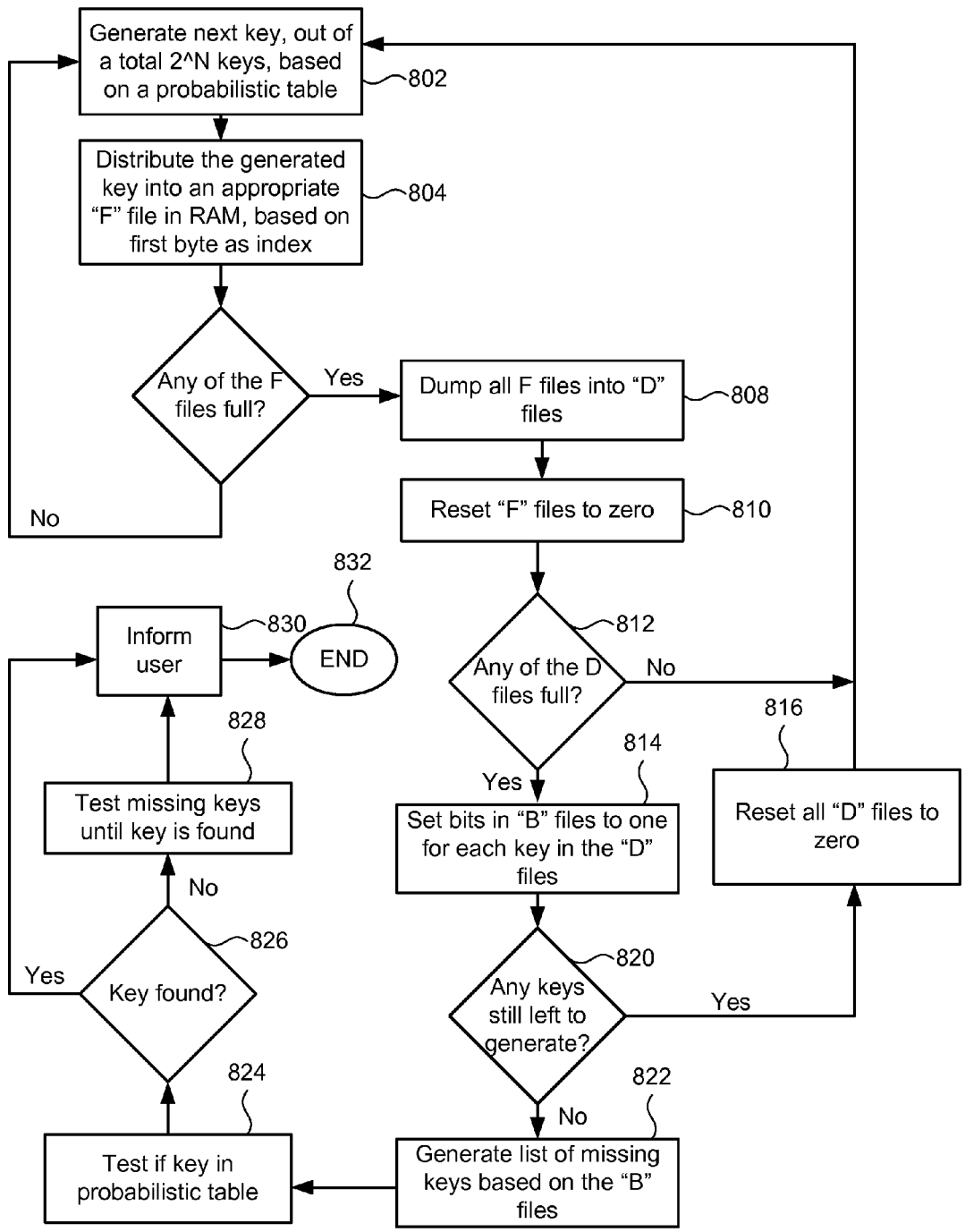
FIG. 8 illustrates an algorithm for identifying keys, according to one embodiment of the invention.

FIG. 8 illustrates an algorithm for deterministically identifying a key for a plaintext cyphertext pair, according to one embodiment of the invention. As shown in FIG. 8, a relatively small portion of the keys are being worked with at any given time. A portion of the keys, based on the Rainbow Table approach that was generated earlier, can be loaded into memory. Alternatively, the keys can be generated on the fly, as the algorithm steps through the successive keys (step 802). In step 804, each generated key is then distributed into the F files, based on the first byte of the key as the index, as discussed earlier. In step 806, if any of the F files are full, then, in step 808, the F files are dumped into the D files. If none of the F files are full, then the algorithm returns to step 802, and the next key is generated.

After step 808, the F files are reset to zero. In step 812, the algorithm checks if any of the D files are full. If not, then the next key is generated, in step 802. If any of the D files are full, then, in step 814, appropriate bits in the B files are set to one, as described earlier.

In step 820, the algorithm checks if there are still any keys left to generate, using the Rainbow Tables (or, if the Rainbow Table was previously generated, checks if there are still any keys left there). If there are, then, in step 816, the D files are reset to zero, and the next key is generated in step 802. If all of the keys from the Rainbow Tables are now accounted for, then the list of missing keys is generated, based on the B files (step 822). Note that the bit mask can be divided into smaller files (in the example above, 512 megabytes long), although the bit mask can be viewed as a single long string (in this example, a string that is $2^{40}$ bits long). In that case, the position of the zero bit in the B file (i.e., in the bit mask that is $2^{40}$ bits, or 1 Terabit, long) corresponds to the value of the key itself.

In step 824, the algorithm tests whether the key that is sought after is found in the Rainbow Tables. If it is, then, in steps 826 and 830, the user is informed accordingly. If it isn't, then the missing keys are sequentially tested, until the correct key is identified (step 828). The user is then informed of the key, in step 830, and the process terminates in step 832.

It should be noted that steps 802-822 can be performed long in advance of the remaining steps 824-832. For example, depending on the length of the key involved, the preparatory work (i.e., steps 802-822) can take anywhere from several weeks to several months, depending on the hardware and the length of key at issue. The remaining steps 824-832 can be performed much later, but usually take much less time.

It should be noted that the example above should be viewed only as a guide to how one particular implementation can be done. With these numbers (40 bit key, 512 KB for each "F" file, 512 MB for each "D" file), the computer hardware required to perform the method reasonably efficiently is quite inexpensive—a computer with 512 MB of RAM and roughly 300 GB of disk space can be purchased today for less than $1000. On the other hand, if better hardware is available—for example, an Intel-based machine with 16 GB of RAM, the "F" files can be made much larger, such as 32 MB each. Similarly, the index of the "F" file can be the first XXX bits of the key (e.g., the first 12 bits, or the first 16 bits), instead of the first byte of the 40-byte key. In this case, the "D" files should also preferably be made larger, such as 1 GB or 2 GB each—it makes little sense to have "D" files that are not at least an order of magnitude larger than the "F" files (and preferably 2 or 3 orders of magnitude larger), given that RAM access speed is roughly 3 orders of magnitude faster than disk access speed.

In theory, even today one could contemplate a desktop computer with 128 GB of RAM (or even 256 GB of RAM—"only" 16 times larger than the 16 GB of RAM one could purchase today for a very "loaded" Apple Computer™ desktop machine). Such a machine would obviously be expensive, probably on the order of $50,000-$80,000—a fairly heroic amount for a desktop computer, although, self-evidently, prices for memory are trending downward over time. Similarly, one could purchase several such "loaded" machines and divide the task among them, or organize them into a cluster. Thus, at least in theory, one could contemplate doing away with the step of "dumping" the "F" files into the "D" files, and simply keeping all the data in RAM and generating the bitmask ("B" files) directly from the "F" files.

However, it will readily be appreciated by one of ordinary skill in the art that regardless of the hardware available, the key length could always be increased—very straightforward calculations show that trying to keep all the data in RAM for a 56-bit key is a practical impossibility in any foreseeable future. In fact, today, use of 40-bit keys is primarily dictated by legacy applications and formats, rather than by any real hardware restrictions—even today, in 2007, 56-bit keys and 64-bit keys are becoming more common. If even those keys become subject to fast attack, then 80-bit keys, or 128-bit keys will be used. In other words, once it becomes clear that 40-bit keys no longer provide sufficient security against cryptographic attack, software vendors will simply move on to longer keys, and the problem of a tradeoff between hardware capabilities, hardware cost and the time it would take to attack the encryption would remain.

Although the discussion above has been primarily in the context of a plaintext—cyphertext pair, the present invention is also applicable to identifying passwords, where the password has been hashed, typically using a hash function. The use of such hash functions is quite common today, and many such functions, such as MD4, MD5, SHA1, SHA2, and so on, are embedded in many popular software products. For example, Microsoft Windows, as well as many word processing and other consumer products, such as Microsoft Word and Adobe Acrobat, store hashed passwords, (hash values of the passwords), rather than the password itself. However, the location where the hash value of the password is stored is usually known (either at a particular location on a disk drive, or at a particular offset, which is always the same, in the Microsoft Word or Adobe Acrobat files.

Thus, the problem of identifying the password can be reduced to a similar approach as described above. In the context of FIG. 1, for example, the unknown key is the password, and the hash function can be viewed as a combination of the plaintext and the cryptographic algorithm (in essence, the plain text is irrelevant in this context). Just as with cryptographic algorithms and keys of a particular length, Rainbow Tables (and probabilistic tables more generally) can be generated. Note that for each set of passwords, and for each particular hash function, different Rainbow Tables would be needed. For example, in the English language, typically passwords are six or eight symbols long. This means that each symbol can have approximately 82 possible values (lower case letters, upper case letters, digits, and some special keyboard symbols). That means that for a six symbol password, there are roughly $2^{38}$ possible combinations of such symbols. For an 8 symbol password, the number is approximately $2^{51}$ possible combinations.

In order to identify the password, the process is substantially the same—generate most (but not all) possible password values, using the Rainbow Table approach. Then, identify the missing passwords, and, if the right password is not found in the Rainbow Tables, test the missing passwords sequentially, to deterministically identify the sought-after password.

Figure 9:
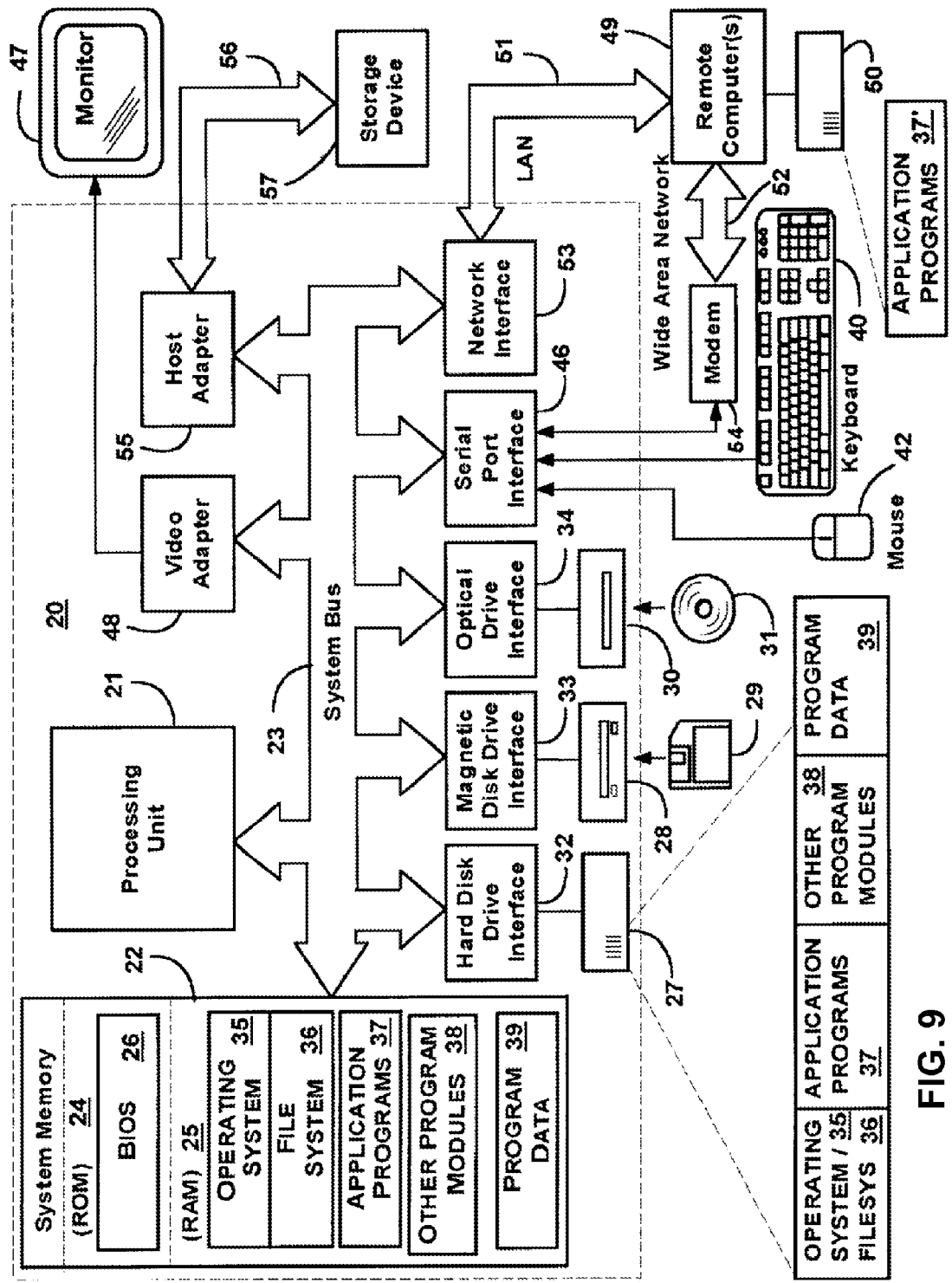
FIG. 9 illustrates a schematic of a computer system on which the invention can be implemented according to one embodiment of the invention.

With reference to FIG. 9, an exemplary system for implementing the invention includes a general purpose computing device in the form of a personal computer or server 20 or the like, including a processing unit 21, a system memory 22, and a system bus 23 that couples various system components including the system memory to the processing unit 21. The system bus 23 may be any of several types of bus structures including a memory bus or memory controller, a peripheral bus, and a local bus using any of a variety of bus architectures. The system memory includes read-only memory (ROM) 24 and random access memory (RAM) 25. A basic input/output system 26 (BIOS), containing the basic routines that help transfer information between elements within the personal computer 20, such as during start-up, is stored in ROM 24.

The personal computer 20 may further include a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD-ROM, DVD-ROM or other optical media The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer-readable media provide non-volatile storage of computer readable instructions, data structures, program modules and other data for the personal computer 20. Although the exemplary environment described herein employs a hard disk, a removable magnetic disk 29 and a removable optical disk 31, it should be appreciated by those skilled in the art that other types of computer readable media that can store data that is accessible by a computer, such as magnetic cassettes, flash memory cards, digital video disks, Bernoulli cartridges, random access memories (RAMs), read-only memories (ROMs) and the like may also be used in the exemplary operating environment.

A number of program modules may be stored on the hard disk, magnetic disk 29, optical disk 31, ROM 24 or RAM 25, including an operating system 35. The computer 20 includes a file system 36 associated with or included within the operating system 35, one or more application programs 37, other program modules 38 and program data 39. A user may enter commands and information into the personal computer 20 through input devices such as a keyboard 40 and pointing device 42. Other input devices (not shown) may include a microphone, joystick, game pad, satellite dish, scanner or the like. These and other input devices are often connected to the processing unit 21 through a serial port interface 46 that is coupled to the system bus, but may be connected by other interfaces, such as a parallel port, game port or universal serial bus (USB). A monitor 47 or other type of display device is also connected to the system bus 23 via an interface, such as a video adapter 48. In addition to the monitor 47, personal computers typically include other peripheral output devices (not shown), such as speakers and printers.

The personal computer 20 may operate in a networked environment using logical connections to one or more remote computers 49. The remote computer (or computers) 49 may be another personal computer, a server, a router, a network PC, a peer device or other common network node, and typically includes many or all of the elements described above relative to the personal computer 20, although only a memory storage device 50 has been illustrated. The logical connections include a local area network (LAN) 51 and a wide area network (WAN) 52. Such networking environments are commonplace in offices, enterprise-wide computer networks, Intranets and the Internet.

When used in a LAN networking environment, the personal computer 20 is connected to the local network 51 through a network interface or adapter 53. When used in a WAN networking environment, the personal computer 20 typically includes a modem 54 or other means for establishing communications over the wide area network 52, such as the Internet. The modem 54, which may be internal or external, is connected to the system bus 23 via the serial port interface 46. In a networked environment, program modules depicted relative to the personal computer 20, or portions thereof, may be stored in the remote memory storage device. It will be appreciated that the network connections shown are exemplary and other means of establishing a communications link between the computers may be used.

Having thus described a preferred embodiment, it should be apparent to those skilled in the art that certain advantages of the described method and apparatus have been achieved. It should also be appreciated that various modifications, adaptations, and alternative embodiments thereof may be made within the scope and spirit of the present invention. The invention is further defined by the following claims.

What is claimed is:

1. A method of recovering a key used to produce a cyphertext-plaintext pair, the method comprising:
    (a) loading at least a portion of a probabilistic key table into memory;
    (b) generating corresponding keys and distributing the keys into a first plurality of buffer files that are in random access memory, such that a beginning portion of each key is used as an index identifying the buffer file;
    (c) when any of the files in the first plurality of buffer files is full, storing contents of the each of the first plurality of buffer files in unused space of a corresponding file of a second plurality of buffer files, wherein the second plurality of buffer files are kept on a hard disk drive;
    (d) resetting the files in the first plurality of buffer files to zero;
    (e) repeating steps (a)-(d) for all keys in the probabilistic key table until at least one of the files of the second plurality of buffer files is full;
    (f) for each of the second plurality of buffer files, updating a bitmask file corresponding to keys missing from the probabilistic key table;
    (g) resetting the files in the second plurality of buffer files to zero;
    (h) repeating steps (a)-(g) for all keys in the probabilistic key table; and
    wherein if the key used to generate the plaintext-cyphertext pair is not in the probabilistic key table, the missing keys can be tested to identify the key used to generate the plaintext-cyphertext pair.

2. The method of claim 1, wherein the probabilistic key table is a Rainbow Table.

3. The method of claim 1, wherein the probabilistic key table is a plurality of Rainbow Tables.

4. The method of claim 1, wherein the probabilistic key table is a Hellman classical table.

5. The method of claim 1, wherein, in step (f), a value of each key in the second plurality of buffer files is used as an index into a corresponding bitmask file.

6. The method of claim 1, wherein, in step (f), a value of each missing key corresponds to a combination of an index of the bitmask file and a position of a bit in the bitmask file that represents whether or not the key is a missing key.

7. The method of claim 1, wherein, in step (f), all the bitmask files are combined into a single bitmask file, and wherein a value of each missing key corresponds to a position of a bit in the bitmask file that represents whether or not the key is a missing key.

8. A method of recovering a key of length $2^N$ used to produce a cyphertext-plaintext pair, the method comprising:
    (a) generating at least some of the $2^N$ keys using a probabilistic key table;
    (b) distributing the keys in a portion of the probabilistic key table into a first plurality of buffer files that are in random access memory, such that a beginning portion of each key is used as an index identifying the buffer file;
    (c) when any of the files in the first plurality of buffer files is full, storing contents of the each of the first plurality of buffer files in unused space of a corresponding file of a second plurality of buffer files, wherein the second plurality of buffer files are kept on a hard disk drive;
    (d) resetting the files in the first plurality of buffer files to zero;
    (e) repeating steps (a)-(d) for all keys in the probabilistic key table until at least one of the files of the second plurality of buffer files is full;
    (f) for each of the second plurality of buffer files, updating a bitmask file corresponding to keys missing from the probabilistic key table;
    (g) resetting the files in the second plurality of buffer files to zero;
    (h) repeating steps (a)-(g) for all keys in the probabilistic key table;
    (j) generating a list of missing keys, based on the bitmask files;
    wherein if the key used to generate the plaintext-cyphertext pair is not in the probabilistic key table, the missing keys can be tested to identify the key used to generate the plaintext-cyphertext pair.

9. A method of recovering a password based on its hash value, the method comprising:
    (a) generating at least some of the possible passwords using a probabilistic hash table;
    (b) distributing the passwords in a portion of the probabilistic hash table into a first plurality of buffer files that are in random access memory, such that a beginning portion of each password is used as an index identifying the buffer file;
    (c) when any of the files in the first plurality of buffer files is full, storing contents of the each of the first plurality of buffer files in unused space of a corresponding file of a second plurality of buffer files, wherein the second plurality of buffer files are kept on a hard disk drive;
    (d) resetting the files in the first plurality of buffer files to zero;
    (e) repeating steps (a)-(d) for all passwords in the probabilistic hash table until at least one of the files of the second plurality of buffer files is full;

(f) for each of the second plurality of buffer files, updating a bitmask file corresponding to passwords missing from the probabilistic hash table;

(g) resetting the files in the second plurality of buffer files to zero;

(h) repeating steps (a)-(g) for all passwords in the probabilistic hash table; and (j) generating a list of missing passwords, based on the bitmask files;

wherein if the password used to produce the hash value is not in the probabilistic hash table, the missing hash values can be tested to identify the password used to generate the hash value.

10. A system recovering a key of length $2^N$ used to produce a cyphertext-plaintext pair, the system comprising a processor, a memory coupled to the processor and computer code loaded into the memory to implement the following:

(a) generating at least some of the $2^N$ keys using a probabilistic key table;

(b) distributing the keys in a portion of the probabilistic key table into a first plurality of buffer files that are in random access memory, such that a beginning portion of each key is used as an index identifying the buffer file;

(c) when any of the files in the first plurality of buffer files is full, storing contents of the each of the first plurality of buffer files in unused space of a corresponding file of a second plurality of buffer files, wherein the second plurality of buffer files are kept on a hard disk drive;

(d) resetting the files in the first plurality of buffer files to zero;

(e) repeating (a)-(d) for all keys in the probabilistic key table until at least one of the files of the second plurality of buffer files is full;

(f) for each of the second plurality of buffer files, updating a bitmask file corresponding to keys missing from the probabilistic key table;

(g) resetting the files in the second plurality of buffer files to zero;

(h) repeating (a)-(g) for all keys in the probabilistic key table;

(j) generating a list of missing keys, based on the bitmask files;

wherein if the key used to generate the plaintext-cyphertext pair is not in the probabilistic key table, the missing keys can be tested to identify the key used to generate the plaintext-cyphertext pair.

11. The system of claim 10, wherein the probabilistic key table is at least one Rainbow Table.

12. The system of claim 10, wherein a value of each key in the second plurality of buffer files is used as an index into a corresponding bitmask file.

13. The system of claim 10, wherein a value of each missing key corresponds to a combination of an index of the bitmask file and a position of a bit in the bitmask file that represents whether or not the key is a missing key.

14. The system of claim 10, wherein all the bitmask files are combined into a single bitmask file, and wherein a value of each missing key corresponds to a position of a bit in the bitmask file that represents whether or not the key is a missing key.

15. A system for recovering a password based on its hash value, the system comprising a processor, a memory coupled to the processor and computer code loaded into the memory to implement the following:

(a) generating at least some of the possible passwords using a probabilistic hash table;

(b) distributing the passwords in a portion of the probabilistic hash table into a first plurality of buffer files that are in random access memory, such that a beginning portion of each password is used as an index identifying the buffer file;

(c) when any of the files in the first plurality of buffer files is full, storing contents of the each of the first plurality of buffer files in unused space of a corresponding file of a second plurality of buffer files, wherein the second plurality of buffer files are kept on a hard disk drive;

(d) resetting the files in the first plurality of buffer files to zero;

(e) repeating (a)-(d) for all passwords in the probabilistic hash table until at least one of the files of the second plurality of buffer files is full;

(f) for each of the second plurality of buffer files, updating a bitmask file corresponding to passwords missing from the probabilistic hash table;

(g) resetting the files in the second plurality of buffer files to zero;

(h) repeating (a)-(g) for all passwords in the probabilistic hash table; and (j) generating a list of missing passwords, based on the bitmask files;

wherein if the password used to produce the hash value is not in the probabilistic hash table, the missing hash values can be tested to identify the password used to generate the hash value.

* * * * *